United States Patent [19]

Turner

[11] Patent Number: 4,682,624
[45] Date of Patent: Jul. 28, 1987

[54] SELF-DRILLING VALVE

[75] Inventor: Clarence C. Turner, Marion, Ind.

[73] Assignee: The Ford Meter Box Company, Inc., Wabash, Ind.

[21] Appl. No.: 895,959

[22] Filed: Aug. 13, 1986

[51] Int. Cl.⁴ .......................... F16K 43/00; F16L 55/10
[52] U.S. Cl. ...................................... 137/318; 137/317
[58] Field of Search ....................... 137/315, 317, 318; 222/80, 81

[56] References Cited

U.S. PATENT DOCUMENTS

| | | | |
|---|---|---|---|
| 3,038,484 | 6/1962 | Smith | 137/318 X |
| 3,756,261 | 9/1973 | Minchhoff | 137/318 X |
| 4,111,588 | 9/1978 | Herron | 137/318 X |
| 4,258,742 | 3/1981 | Louthay et al. | 137/318 |

Primary Examiner—A. Michael Chambers
Assistant Examiner—John C. Fox
Attorney, Agent, or Firm—Pearne, Gordon, McCoy & Granger

[57] ABSTRACT

A self-drilling valve for tapping into water mains is disclosed. The valve provides a through bore providing a valve seat at its forward end and threaded for the remainder of its length. A cutter is located in the bore and provides a threaded head at its rearward end and a relatively long, tubular shank at its forward end. Cutting edges are provided at the forward end of the shank so that when the cutter is rotated and threaded forwardly against the surface of the water main, an opening is cut through the wall thereof. A guiding seal is positioned in the valve seat adjacent to the forward end of the cutter prior to and during the cutting operation to laterally position the forward end of the cutter during the cutting operation. Such seal remains with the cutter as the cutter is retracted so that the shank extends through the seal in all positions and does not have to re-enter the seal. The valve is closed by threading the cutter forward, causing the seal to be positioned within the seat and provide a positive seal between the cutter and housing.

13 Claims, 5 Drawing Figures

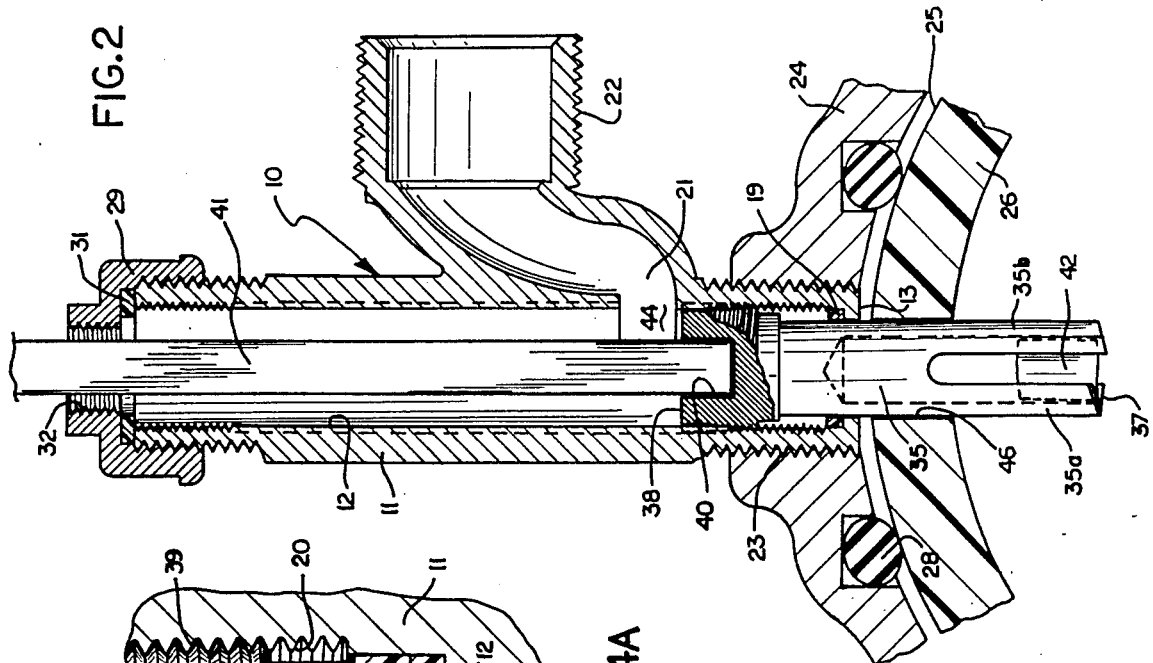
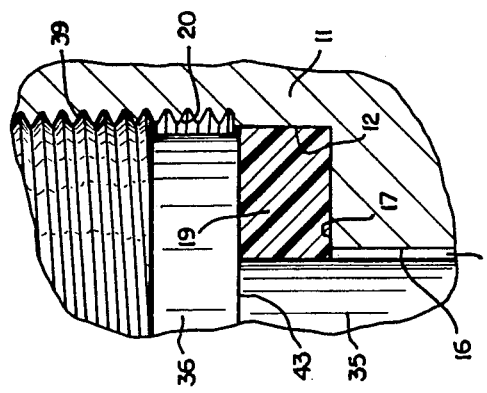
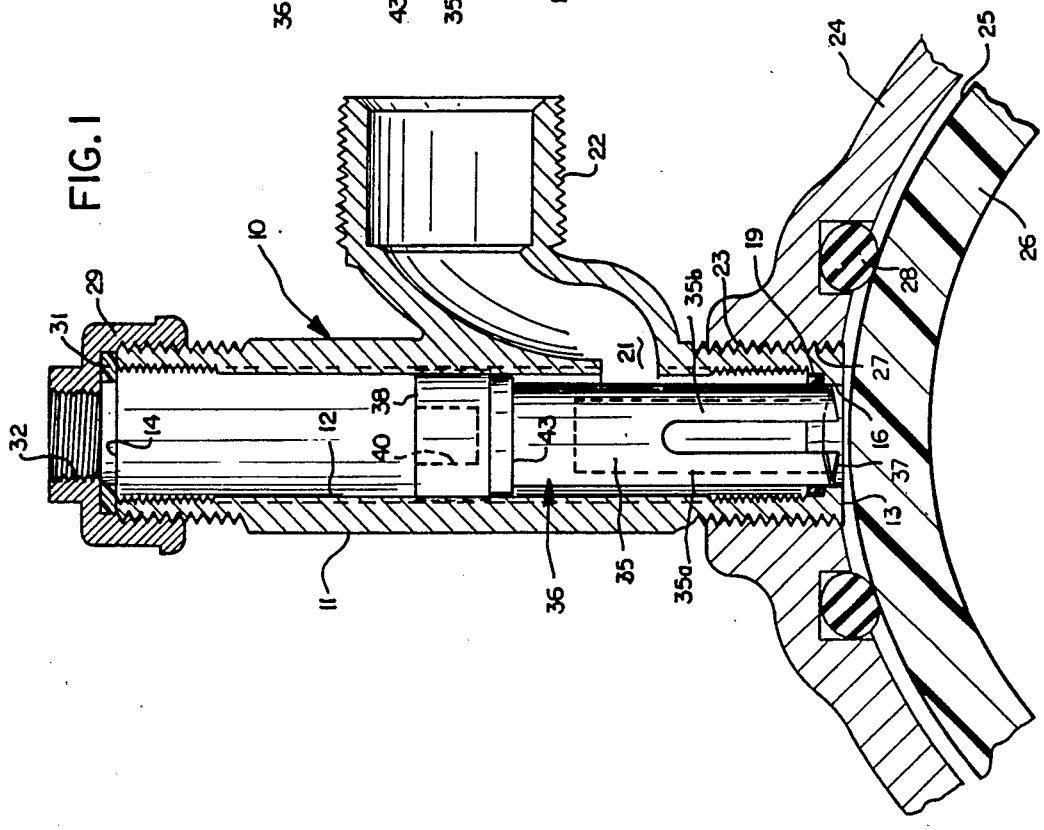

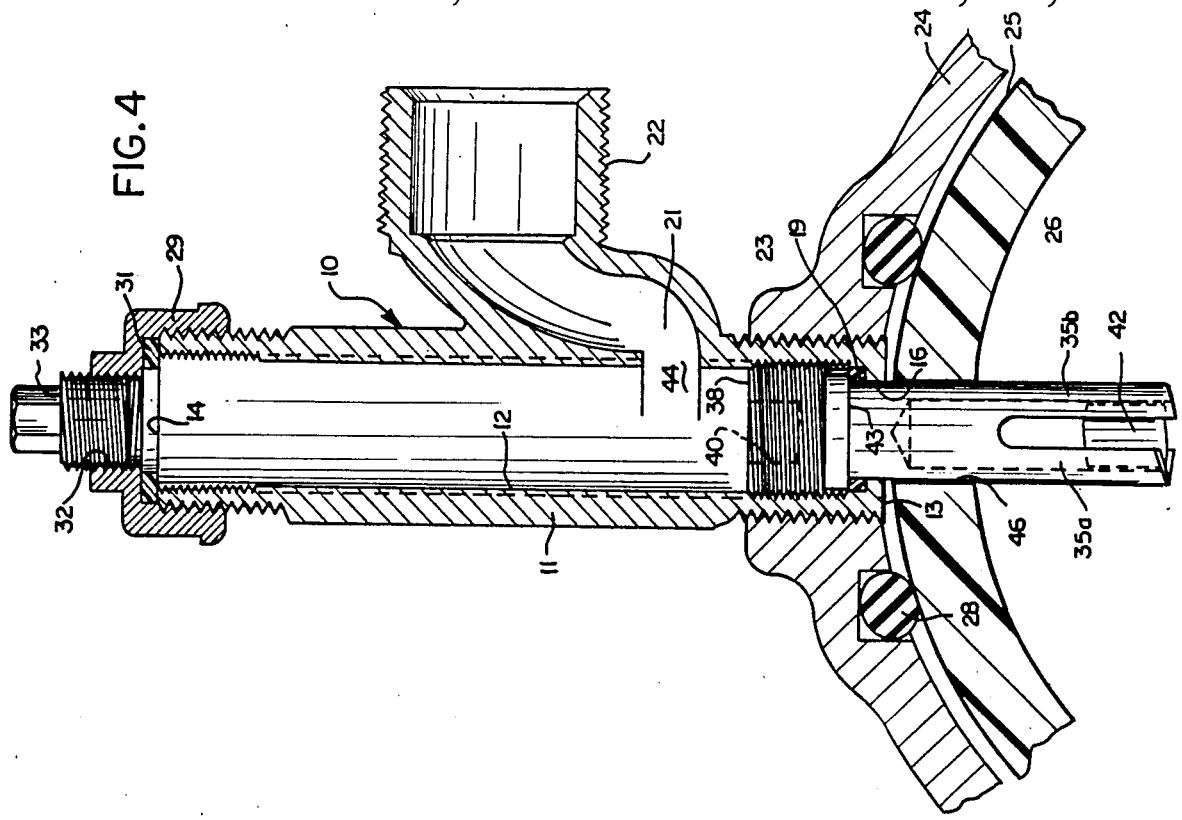
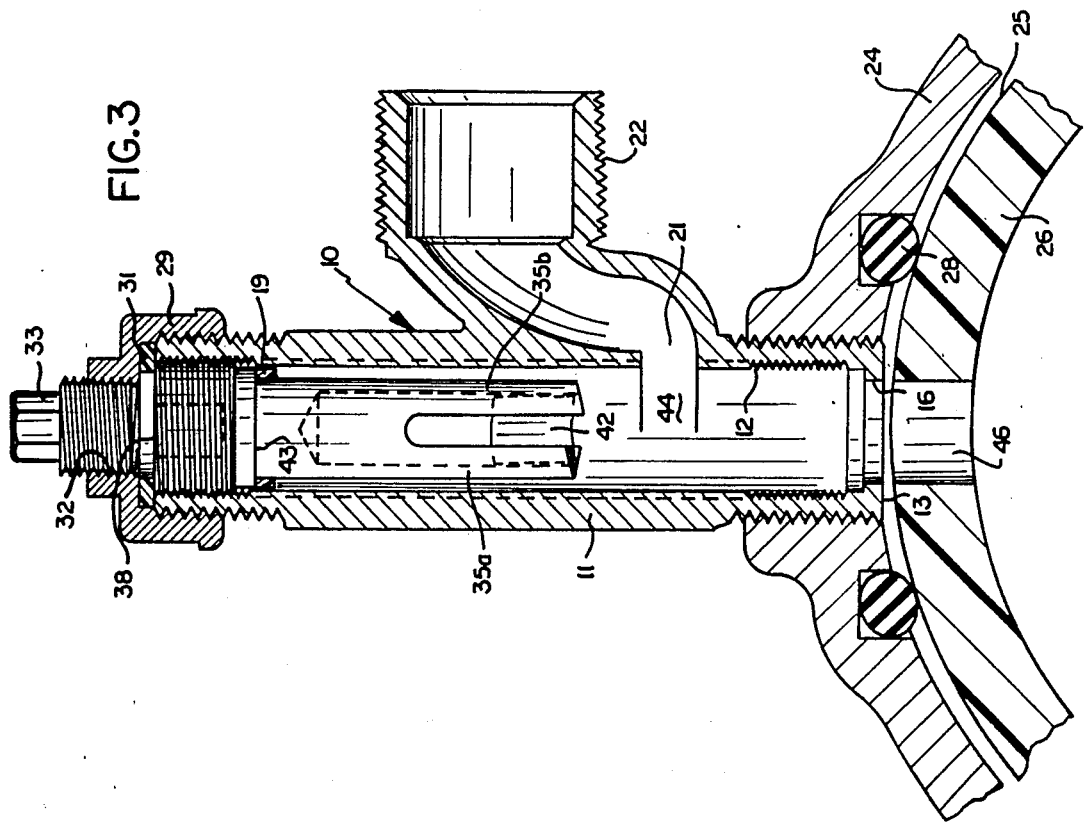

SELF-DRILLING VALVE

BACKGROUND OF THE INVENTION

This invention relates generally to an apparatus for tapping into pipeline and the like, and more particularly to a novel and improved, self-drilling valve for tapping into pipelines such as water mains and the like.

PRIOR ART

Various types of devices have been known for tapping into existing pipelines such as water mains and the like. Some such devices are also often operable to provide a valving function permitting the tapped line to be shut off when desired. Examples of such devices are illustrated in U.S. Pat. Nos. 2,839,075; 3,692,044; 3,896,842; and 3,905,718.

Some such devices are intended for tapping into plastic mains, and cutters or drilling devices thereof are intended to cut a coupon portion from the wall of the pipeline or main and to retain the coupon in the cutter so that it is not released to the pipeline or into the tapped line. Further, some such devices utilize the engagement between the cutter and the wall of the opening in the main to provide the sealing function.

When a coupon-retaining tapping device is provided, a tubular cutter is normally used. Such cutters, if not provided with good lateral guiding, tend to move laterally when the cutter initially engages the curved surface of the pipeline or main. Consequently, if good lateral support is not provided for the forward end of the cutter, the opening in the pipeline or main is not accurately located and difficulty is often encountered both in the drilling operation and when the valve is closed.

SUMMARY OF THE INVENTION

In accordance with the present invention, a novel and improved structurally simple pipeline tapping valve is provided that is reliable in operation and economical to manufacture.

The illustrated embodiment is particularly adapted for tapping into plastic water mains and the like, and is structured to retain the coupon so that it is not released into the water main or the tapped system. The tapping valve provides a tubular cutter and guiding seal which functions during the tapping operation to accurately position the forward end of the cutter so that the location of the opening in the water main is accurately established. Subsequently, the guiding seal moves with the cutter and cooperates with the cutter to provide part of the valving structure. Consequently, the cutter does not have to enter and exit from the seal itself during the subsequent valving operation. Therefore, the valve can be repeatedly opened and closed without causing damage to the guiding seal. Further, the valving structure is provided entirely by the unit so it is not necessary to depend on a valve seal with the pipeline or main itself.

These and other objects of this invention are illustrated in the accompanying drawings, and are more fully described in the following specification.

BRIEF DESCRIPTION OF THE DRAWINGS

FIG. 1 is a side elevation in cross section of a water main with a tapping valve in accordance with the present invention mounted thereon, and illustrating the cutter in a position adjacent to the surface of the main;

FIG. 2 is a cross section similar to FIG. 1 at the completion of the cutting operation;

FIG. 3 is a view similar to FIG. 1 illustrating the position of the cutter when the valve is fully opened;

FIG. 4 is cross section similar to FIG. 1 illustrating the tapping valve in the closed position; and FIG. 4A is an enlarged, fragmentary section of the sealing structure when the valve is closed.

DETAILED DESCRIPTION OF THE DRAWINGS

The illustrated embodiment of this invention is particularly suited for tapping into a plastic water main, and may be used, for example, to connect a dwelling to an existing water main formed of plastic pipe, such as PVC pipe. It should be understood, however, that within the broader aspects of this invention, a tapping valve may be used for connection to other types of mains and, with suitable modification of the cutter, can be used for tapping into non-plastic pipelines or mains.

In the illustrated embodiment, the tapping valve 10 includes a housing 11 having a through bore or passage 12 extending from a forward end 13 to a rearward end 14. Adjacent to the forward end of the bore 12, the housing is provided with a stepped shoulder 16 providing a radially extending face 17 (best illustrated in FIG. 4A) and an axially extending, cylindrical surface 12. The radial face 17 and cylindrical surface 12 cooperate to provide a set for a guiding seal 19 formed of a suitable seal material such as nylon. Rearwardly of the stepped shoulder 16, the bore 12 is provided with threads 20 extending to the rearward end 14.

A lateral passage 21 is opened at its inner end to the bore 12 and is open at its other end through a coupling portion 22 which is externally threaded to permit construction of a conventional water line or the like.

The forward end of the housing is provided with external threads 23 so that the housing can be mounted on a conventional saddle 24. Such saddle 24 is clamped against the exterior surface 25 of a plastic water main 26, which may be, for example, formed of PVC or the like. Only a portion of the saddle is illustrated in the drawings, since the saddle, per se, forms no part of this invention and saddles of this type are well known to persons skilled in the art.

The saddle 24 is provided with a threaded opening 27 into which the forward end of the housing 11 is threaded for mounting the housing on the saddle. The saddle also provides a seal 28 which engages the exterior surface 25 of the water main 26 and provides a fluidtight joint between the saddle 24 and the main 26 around the opening 27.

The rearward end of the housing 11 is also provided with external threads for mounting an end cap 29 on the rearward end 14 of the housing. A gasket 31 is provided to ensure a good fluidtight joint between the cap 29 and the rearward end of the housing 14.

The cap 29 provides a threaded bore 32 of reduced diameter in which a typical plug 33 is installed, as illustrated in FIGS. 3 and 4, after the tapping into the main is completed.

The tapping and valving functions are performed by a cutter or drill 36. The cutter 36 is provided with a relatively long, tubular shank portion 35 so that the cutter can be used to cut an opening in thick-walled mains. In the illustrated embodiment, the shank includes two separate and opposed semicylindrical cutter portions 35a and 35b. The forward ends of the cutter portions 35a and 35b are formed with similar and separate cutting edges 37 adapted to cut through the wall of the main 26 as the cutter is rotated and axially fed forward relative to the housing 11. The rearward end of the cutter 36 is provided with an enlarged head 38 which is provided with external threads 39 mating with the internal threads 20 extending along the bore 12. The head 38 is also provided with a socket recess 40 so that a tool 41 extending through the bore 32 can be used to rotate the cutter to either extend the cutter or retract the cutter along the bore 12. The length of the shank 35 is substantially greater than the length of the head 38.

The operation of the tapping valve is progressively illustrated in the drawings. Initially, the cutter is positioned so that the forward end of the cutting portion extends through the guiding seal 19 but is spaced rearwardly a small distance from the surface 25 of the main 26, as illustrated in FIG. 1. Initially, the guiding seal 19 is positioned on the extremity of the cutter 37 and contacts the valve seat provided by the stepped shoulder 16 and the bore 12 to laterally position the forward end of the cutter accurately. The guiding seal provides substantially zero clearance so the forward end of the cutter is accurately positioned.

Since the cutting portion is relatively long to permit the cutter to be used to cut through relatively thick-walled mains, the threaded head portion 38 is substantially spaced back from the forward end of the cutter and cannot be relied upon to provide accurate lateral positioning of the forward end of the cutter prior to cutting and as the cutting commences. However, the guiding seal 19, because it engages the cutter shank 35 adjacent to the forward end thereof, provides accurate lateral positioning of the cutter prior to and during the actual cutting operation.

Prior to the actual tapping operation, the saddle 24 is installed and clamped against the exterior surface of the main so that a fluid tight joint is provided around the forward end of the tapping valve by the seal 28.

The cutting operation is performed by inserting a tool 41 through the bore 32 and rotating the cutter in a direction which causes it to be threaded forward along the passage, causing the cutting edges 37 at the forward end of the cutter portion to engage the exterior surface of the main 26. As the cutting edges approach the surface 25 and begin to cut into the main 26, the guiding seal 19 accurately establishes the lateral position of the cutting edges 37. Continued rotation causes the cutter to cut an opening 46 through the wall of the main 26, as illustrated in FIG. 2.

The cutter portion 37 is formed so that the coupon 42 cut from the wall of the main extends in along the forward end of the cutter portion, as illustrated in FIG. 2, and is held by the cutter portion so that the coupon is not released into the main. At the completion of the cutting operation, communication is provided between the interior of the main and the forward end of the housing 11.

The opening 44 between the lateral passage 21 and the bore 12 has an axial extent less than the axial length of the threaded head 38 to eliminate splash as the head is threaded across the opening of the lateral passage 21.

If the main is to be opened, the tool 41 is rotated in the opposite direction to cause the cutter to retract along the bore 12 to the fully retracted position illustrated in FIG. 3. At such time, the cutter is retracted into the portion of the bore 12 rearwardly of the opening between the lateral passage 21 and the bore so that full flow can occur from the main through the coupling portion to the line connected thereto. Because of closeness of fit of the seal 19 to the cutter 37, the seal 19 moves rearwardly with the cutter as it is retracted. It should be understood that the seal 19 does not provide a fluidtight joint between the internal threads 20 and the cutter; however, the threads 39 formed on the head provide a sufficiently close fit with the threads 20 that leakage past the cutter 36 does not present any particular problem during the retraction of the cutter 36 to the fully retracted position of FIG. 3.

If the cutter has been fully extended to close the valve prior to being in the retracted position of FIG. 3, the seal is positioned against a shoulder 43 between the cutter portion 37 and the head. Otherwise, the seal tightly engages the cutter portion and is located at an intermediate point along the length of such portion.

The gasket 31 is sized to extend inwardly beyond the end of the housing so that when the cutter is fully retracted as illustrated in FIG. 3, the head 38 engages the gasket 31 and forms a seal at the rearward end 14 of the housing. In order to prevent the entry of dirt or the like and to provide an additional seal, the plug 33 is then installed.

At any time it is desired to shut off the connection between the nipple 22 and the main, the plug 33 is removed and the tool 41 is inserted into the socket in the head 38. Rotation of the tool then causes the cutter to extend to the fully extended position illustrated in FIGS. 4 and 4A, in which the seal carried by the cutter is returned to the stepped shoulder 16 and seated to provide a fluidtight seal between the shoulder 43 and the surface 17 at the foward end of the housing, thereby isolating the line connected to the nipple 22 from the water main 26. If the valve is to remain closed, the plug 33 is again installed to close the rearward end of the housing.

During the cutting operation, the coupon 42 is wedged back into the forward end of the cutter, where it is resiliently gripped. This tends to cause a slight expanding of the cutter, which does not interfere with the retraction or extension of the cutter through the wall of the main. However, if the seal 19 were mounted so as to remain in its forward initial position during such retraction, the seal would tend to be damaged by the expanded cutter when the cutter re-entered the seal during the valve closing operation. By providing a system in which the cutter does not retract out of the seal, such damage is avoided.

The clearance 47, best illustrated in FIG. 4A, between the diameter of the forward end of the cutter and the inner surface of the stepped shoulder 16 is sufficiently large to permit easy reentry of the forward end of the cutter after it is fully retracted. However, such clearance does not adversely affect the centering of the cutter prior to and during the initial cutting operation, since the centering of the cutter during such time is provided by the guiding seal 19.

In accordance with this invention, a structurally simple tapping valve is provided in which the forward end of the unit is provided with a dual functioning guiding seal. Such seal functions during the initial cutting operation to accurately establish the lateral position of the cutter even though the cutter is otherwise unsupported along a shank portion 36 thereof extending from the head. During the subsequent operations, the seal remains adjacent to the head and damage to the seal does not occur as the valve is opened and closed. Consequently, a structure is provided which functions reliably and which can be opened and closed repeatedly without seal damage even when the cutter expands a small amount when it grips the coupon.

Although the preferred embodiment of this invention has been shown and described, it should be understood that various modifications and rearrangements of the parts may be resorted to without departing from the scope of the invention as disclosed and claimed herein.

What is claimed is:

1. A fitting for tapping into a pipeline comprising a housing having a first passage extending from a forward end to a rearward end, mounting means for mounting said housing with said forward end of said passage adjacent to a pipeline, cutter means in said first passage, interconnecting means operable to move said cutter means along said first passage between an extended position and a retracted position, movement of said cutter means toward said extended position operating to cut through the wall of a pipeline positioned adjacent to said forward end to provide communication between such pipeline and said passage, said housing providing a second passage opening into said first passage at a location spaced from said forward end of said flat passage, said cutter means in said retracted position permitting communication between said first and second passages and in said extended position isolating said forward end of said first passage from said second passage, said cutter means providing seal and guiding means located at said forward end of said first passage while said cutter means cuts through the walls of such pipeline and operating to guide said cutter means adjacent to said pipeline and provide accurate location of the opening cut therein, said seal and guide means moving with said cutter means away from said forward end when said cutter means moves toward said retracted position after cutting an opening in said pipeline, said seal and guide means being carried back to said forward end with said cutter when said cutter moves to said extended position and operating to provide a seal between said cutter means and housing to isolate said second passage from said forward end of said first passage.

2. A fitting as set forth in claim 1, wherein said interconnecting means are provided by mating threads on said body and cutter.

3. A fitting as set forth in claim 2, wherein said cutter means provides a reduced diameter shank having a cutter at the forward ends thereof and a larger diameter head at the rearward end thereof which guides said rearward end along said first passage.

4. A fitting as set forth in claim 3, wherein said mating threads are provided on said head and the inner surface of said passage.

5. A fitting as set forth in claim 4, wherein said shank has a length substantially longer than said head.

6. A fitting as set forth in claim 5, wherein said head has a length greater than said opening of said second passage into said first passage.

7. A fitting as set forth in claim 5, wherein said housing provides a valve seat adjacent to said forward end, said valve seat being structured to allow said seal and guide means to move axially of said first passage into said valve seat and move axially of said passage in the opposite direction away from said valve seat.

8. A fitting as set forth in claim 7, wherein said seal and guide means is formed of a seal material sized to fit said valve seat and said shank with substantially zero clearance.

9. A fitting as set forth in claim 1, wherein a second seal provides a fluidtight joint between the rearward end of said cutter means and said housing when said cutter means is in said retracted position.

10. A fitting as set forth in claim 9, wherein said second seal is mounted at the rearward end of said first passage and is engaged by said cutter when said cutter is fully retracted away from said forward end and clear of said second passage.

11. A fitting as set forth in claim 1, wherein said cutter means provides a tubular cutting end operable to cut and retain a coupon.

12. A fitting for tapping into a plastic water main comprising a housing threaded at its forward end for mounting in a saddle, said housing providing a through passage having a valve seat at its forward end and threaded from said valve seat to its rearward end, a second passage in said housing open to said first passage intermediate its ends, a cutter providing a threaded head at its rearward end mating with said threads of said first passage, said cutter also providing a shank extending forwardly from said head providing cutting edges at the forward end thereof for cutting through a plastic water main, said shank providing a tubular forward end for receiving a coupon cut from the wall of a water main, and seal and guide means formed of a seal material, said seal and guide means being positioned in said valve seat adjacent the forward ends of said cutter laterally positioning said forward end prior to and during cutting into a water main, said seal and guide means retracting along with said cutter when said cutter moves rearwardly along said passage to provide communication between said forward end and said second passage, said seal and guide means being positioned in said valve seat and providing a fluidtight joint between said cutter and said forward end of said housing when said cutter is fully extended.

13. A fitting as set forth in claim 12, wherein said shank extends through said seal and guide means in all positions of said cutter.

* * * * *